J. W. BROOKS.
VALVE CUTTING MACHINE.
APPLICATION FILED APR. 25, 1914.

1,198,697.

Patented Sept. 19, 1916.
2 SHEETS—SHEET 1.

Witnesses
Wm. H. Mulligan
Thos. J. Woodward

Inventor
John W. Brooks
By Richard B. Owen
Attorney

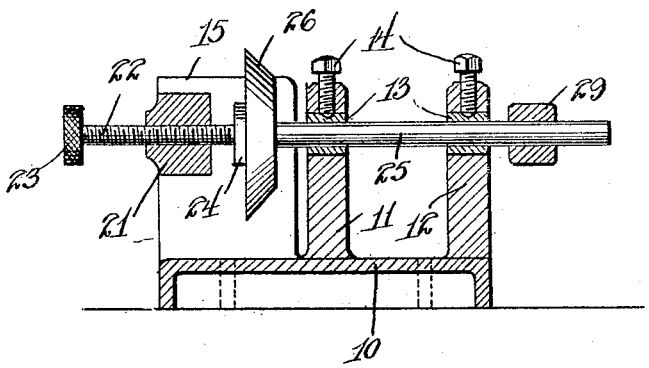
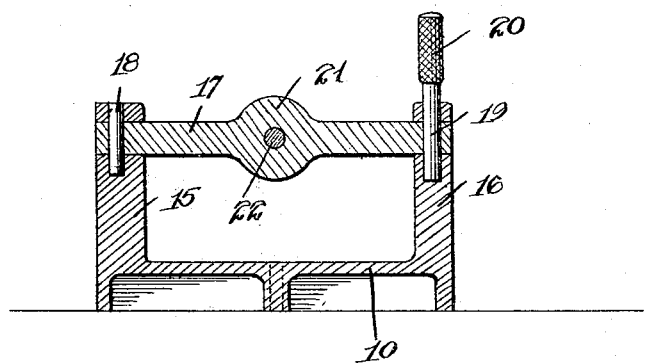

UNITED STATES PATENT OFFICE.

JOHN W. BROOKS, OF STAMFORD, CONNECTICUT.

VALVE-CUTTING MACHINE.

1,198,697.   Specification of Letters Patent.   Patented Sept. 19, 1916.

Application filed April 25, 1914. Serial No. 834,479.

*To all whom it may concern:*

Be it known that I, JOHN W. BROOKS, a citizen of the United States, residing at Stamford, in the county of Fairfield and State of Connecticut, have invented certain new and useful Improvements in Valve-Cutting Machines, of which the following is a specification.

This invention relates to a cutting machine which is used for refacing a valve and the principal object of the invention is to provide a machine which will be relatively small and light and easy to handle and one in which the valve may be easily and quickly inserted and held in the desired position while trimming the valve.

This invention is illustrated in the accompanying drawings, in which—

Figure 1:
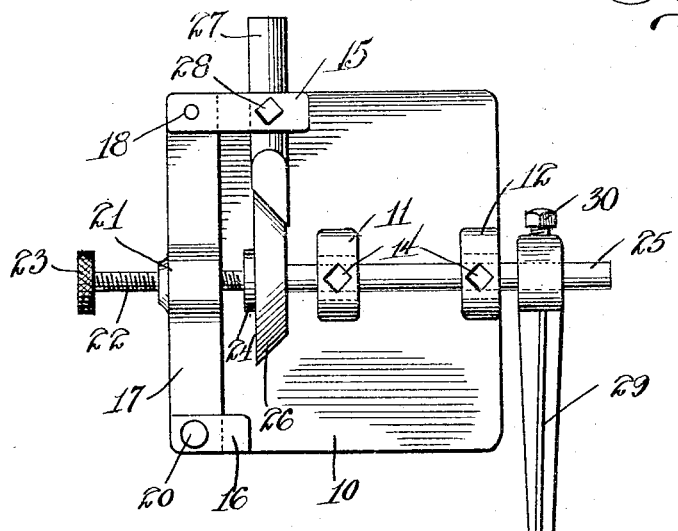
Figure 2:
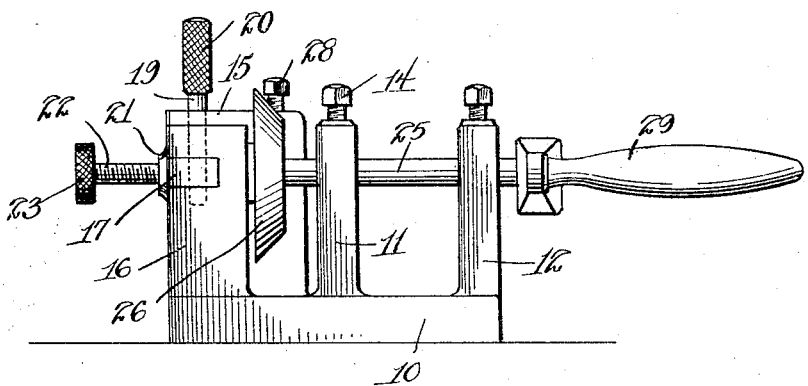

Figure 1 is a top plan view of the valve cutter with a valve in place; Fig. 2 is a side elevation of the valve cutter shown in Fig. 1; Fig. 3 is a longitudinal sectional view through the valve cutter with the valve shown in elevation; and Fig. 4 is a transverse sectional view through the valve cutter.

This valve cutter is preferably formed of cast metal but may be formed in any other suitable manner. The base 10 carries standards 11 and 12 in the upper end portions of which are mounted bushings 13 forming bearings, the bushings being releasably held in place by means of set screws 14. Adjacent the sides of the opposite end portion of the base are mounted the blocks 15 and 16, a cross bar 17 being pivotally connected with the block 15 by means of the pin 18 and releasably held in engagement with the block 16 by means of the pin 19 which is provided with an enlarged and roughened head 20 so that the pin 19 may be easily removed. The central portion of the cross bar 17 is enlarged to form a bearing 21 through which the threaded stem 22 passes. This stem 22 is provided at its outer end with an enlarged head 23 by means of which the stem 22 may be easily rotated and is provided at its inner end with a rotatably mounted bearing disk 24. This bearing 21 is located upon the cross bar 17 at such a point that it will be positioned in alinement with bushings 13 when the cross bar is closed.

When using this valve cutter the pin 19 is removed and the cross bar 17 swung outwardly and the valve stem 25 is then passed through the bushings 13. The cross bar 17 is then swung to a closed position and secured by pin 19 and the stem 22 moved to bring the valve head 26 into engagement with the cutting tool 27 which passes through an opening formed in the block 15 and is held in an adjusted position by the set screw 28. The valve stem is then rotated by means of the handle 29 and secured thereon by means of the set screw 30 thus causing the beveled edge of the valve to be trimmed by the cutting tool 27. After the valve has been cut the pin 19 is removed and the cross bar 17 swung to an open position thus permitting the valve to be removed from the cutting machine after the handle has been removed from the stem 25.

This machine can be used for cutting valves of various sizes since the cutting tool 27 is adjustably mounted and therefore can be moved to accommodate itself to any size valve. It should also be noted that the bushings are removable and that therefore the bushings may be removed when worn out or if it is necessary to replace the bushings with new ones so as to receive valve stems which are either too large or too small for the bushings already in place. It should also be noted that if desired these bushings may be formed of resilient material so that they may be compressed to conform to the size of a valve stem which may be smaller than the valve stems for which they are intended.

It will thus be seen that I have provided a valve cutting machine which will be relatively small and simple in construction and which may be cheaply made since the base standards and blocks may be cast in one piece and the cross bar 17 may also be cast and easily connected with block 15.

It should also be noted that this machine will not very quickly wear out since the standards 11 and 12 carry bushings which will take up the wear and which may be renewed when worn out.

It is of course obvious that if desired a bushing may be placed in bearing 21, though this is not necessary since there is not much wear upon this bearing.

What is claimed is:—

1. A valve cutter comprising a base, standards positioned in alinement upon said base and provided with bearings, blocks carried by said base upon opposite sides of the line of said standards, one of said blocks being provided with tool holding means, a cross bar movably connected with one of said blocks, means for releasably connecting said bar with the other of said blocks, and means adjustably carried by said bar for engaging a valve head to hold the valve head in engagement with the cutting edge of a tool carried by said tool holding means of said first mentioned block.

2. A valve cutter including a base equipped with standards, a bearing mounted in each of said standards to receive the stem of the valve, means arranged in each standard to prevent movement of the bearings, blocks mounted on said base, a cross bar pivotally mounted in one of said blocks, the said block also capacitating as a holder for the cutting tool, and means mounted in said bar to engage the bar for holding the latter to be acted upon by said tool.

In testimony whereof I affix my signature in presence of two witnesses.

JOHN W. BROOKS.

Witnesses:
BENJAMIN H. MEAD,
FLOYD B. BARTRAM.

Copies of this patent may be obtained for five cents each, by addressing the "Commissioner of Patents, Washington, D. C."